United States Patent [19]
Choi

[11] Patent Number: 6,025,884
[45] Date of Patent: Feb. 15, 2000

[54] MULTIMEDIA DISPLAY MONITOR APPARATUS

[75] Inventor: Chun-Geun Choi, Kyungki-do, Rep. of Korea

[73] Assignee: SamSung Electronics Co., Ltd., Kyungki-do, Rep. of Korea

[21] Appl. No.: 08/912,512

[22] Filed: Aug. 18, 1997

[30] Foreign Application Priority Data

Aug. 16, 1996 [KR] Rep. of Korea ....................... 96-33955

[51] Int. Cl.⁷ ...................................... H04N 5/45
[52] U.S. Cl. ........................... 348/565; 348/566; 348/567
[58] Field of Search ..................... 348/565, 564, 348/566, 567, 586, 588, 598, 599, 552; H04N 5/445, 5/45

[56] References Cited

U.S. PATENT DOCUMENTS 5,111,296 5/1992 Duffield ................................... 348/565
5,113,259 5/1992 Romesburg et al. ................... 348/565

*Primary Examiner*—Sherrie Hsia
*Attorney, Agent, or Firm*—Robert E. Bushnell, Esq.

[57] ABSTRACT

A video display monitor apparatus has a composite input circuit, which receives either a composite TV signal or an additional composite television signal supplied from a video player such as a video cassette recorder, separates horizontal and vertical synchronizing signals, Y and C video signals from the received composite television signal, and transforms the separated Y and C video signals into analog R, G and B video signals. Two video processing circuits and a timing control circuit are provided for the display monitor apparatus. The timing control circuit performs timing control for the video processing circuits, in response to the synchronizing signals and additional horizontal and vertical synchronizing signals applied from a personal computer. The viewing area of the image formed by video signals from the computer is disposed within the viewing area of the image formed by the TV video signals in the form of picture-in-picture.

19 Claims, 3 Drawing Sheets

MULTIMEDIA DISPLAY MONITOR APPARATUS

CLAIM OF PRIORITY

This application makes reference to, incorporates the same herein, and claims all benefits accruing under 35 U.S.C §119 from an application entitled *A Multi-Media Display Monitor Apparatus* earlier filed in the Korean Industrial Property Office on Aug. 16, 1996, and there duly assigned Serial No. 96-33955 by that Office.

BACKGROUND OF THE INVENTION

1. Field of the Invention

The present invention relates to a video display monitor apparatus for a computer system, more particularly to a video display monitor apparatus useful for a home computer system to control several home applications and home automation systems.

2. Background Art

There has been a recent trend toward multimedia computers, many modern personal computer systems thus have multimedia boards such as a MPEG board, a TV board, a sound card, and so on. The MPEG or TV board almost has picture-in-picture (PIP) capability, that is, the capability to receive video signals from two different sources and combine them to produce a signal, when displayed, which includes a still picture (i.e., original computer image) in a primary viewing area and a moving picture (i.e., MPEG or TV image) in a secondary viewing area (i.e., a small viewing window) on the same display monitor screen, or conversely, a still picture in a secondary viewing area and a moving picture in a primary viewing area.

Meanwhile, various applications of personal computers have been proposed. The computers have been used for home automation and application systems such as automatic telephone answering systems, home security systems, home theater systems, TV receiver systems, etc. Namely, modern personal computer system functions as a home computer system for the whole family. Thus, it is desirable that the computer be conveniently located in a living room for the family's use.

A typical arrangement for being able to simultaneously display a television signal and an image from a computer on a television receiver is described in U.S. Pat. No. 5,113,259 to Eric D. Romesburg, et al. entitled *Data Transfer From An External Computer To A Television Receiver Having Picture-In-Picture Capability*.

SUMMARY OF THE INVENTION

It is an object of the present invention to provide a video display monitor apparatus capable of displaying either an image from a home computer which may control home applications and automation systems, a television (TV) image, or both images on a screen thereof at the same time.

It is another object of the present invention to provide a video display monitor apparatus, in which an image from a home computer can be displayed within a TV image in the form of picture-in-picture (PIP), or vice versa.

In order to attain the above objects, according to an aspect of the present invention, there is provided a video display monitor apparatus having a predetermined resolution, the apparatus comprising: a composite input circuit for receiving a composite TV signal, separating first horizontal and vertical synchronizing signals and luminance Y and chrominance C video signals from the received composite signal, and transforming the separated Y and C video signals into first analog R, G and B video signals; a timing control circuit for performing timing control in response to the first synchronizing signals and second horizontal and vertical synchronizing signals, wherein the timing control circuit receives the second synchronizing signals from a computer; a first video processing circuit for converting the first analog R, G and B video signals into second analog R, G and B video signals suitable for the predetermined resolution in accordance with the timing control of the timing control circuit; and a second video processing circuit for converting third analog R, G and B video signals supplied from a computer into fourth analog R, G and B video signals suitable for the predetermined resolution in accordance with the timing control of the timing control circuit.

The composite input circuit may include an input terminal for receiving an additional composite signal supplied from a video player apparatus such as a video cassette recorder, a video disc player, and so on. The composite input circuit separates additional horizontal and vertical synchronizing signals and additional Y and C video signals from the received additional composite signal, and transforms the additional separated Y and C video signals into the first R, G and B video signals.

As is apparent from the foregoing, according to the video display monitor apparatus of the present invention, a user can watch a still picture (i.e., an image formed by video signals from a home computer) together with a moving picture (i.e., an image formed by either TV or VCR video signals) simultaneously in the form of PIP so as to control home application and automation systems without changing from the moving mode to the still mode.

BRIEF DESCRIPTION OF THE DRAWINGS

A more complete appreciation of the present invention, and many of the attendant advantages thereof, will become readily apparent as the same becomes better understood by reference to the following detailed description when read in conjunction with the accompanying drawings, wherein.

DESCRIPTION OF THE PREFERRED EMBODIMENT

Figure 1:
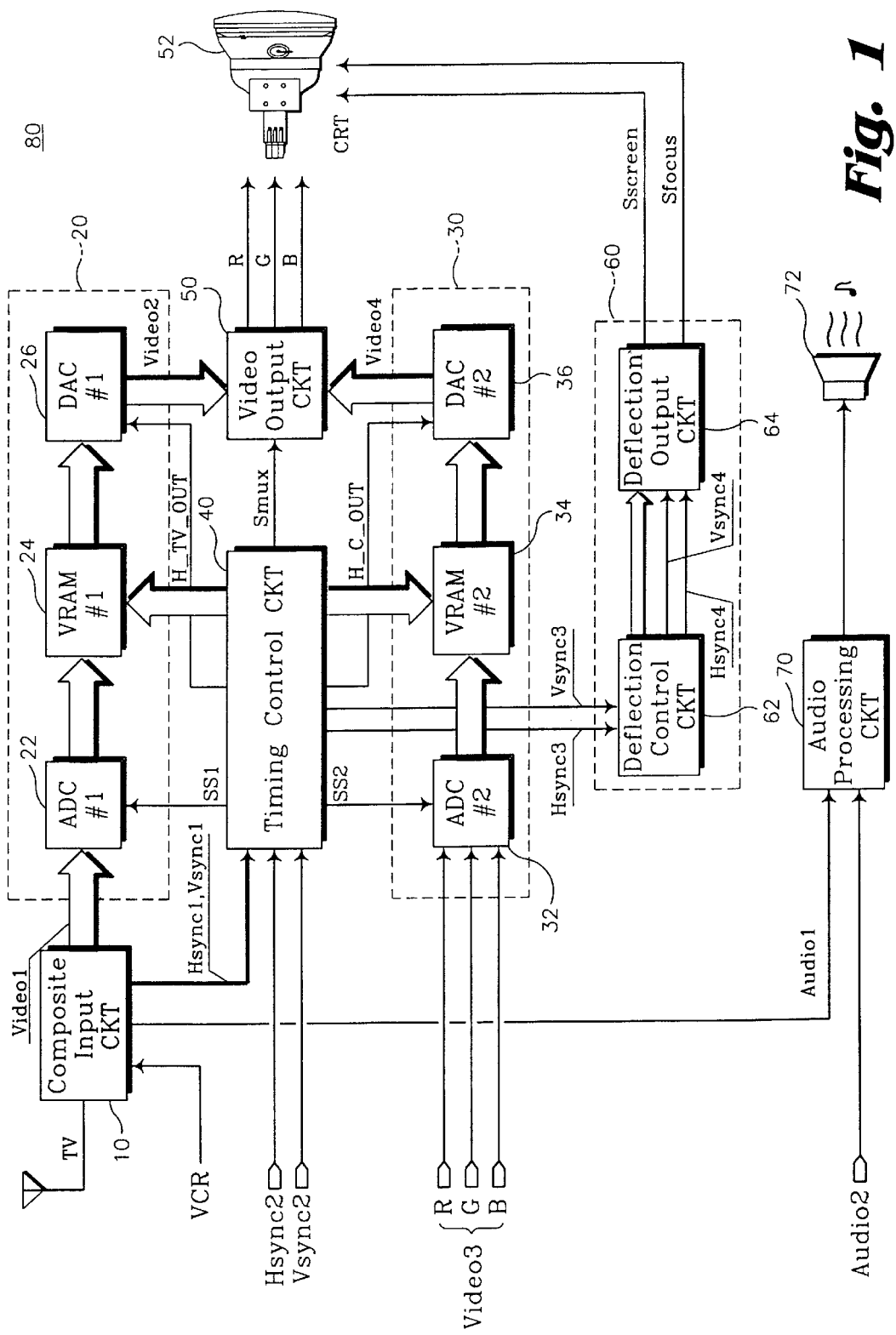
FIG. 1 is a block diagram showing a video display monitor apparatus according to a preferred embodiment of the present invention.
Figure 2:
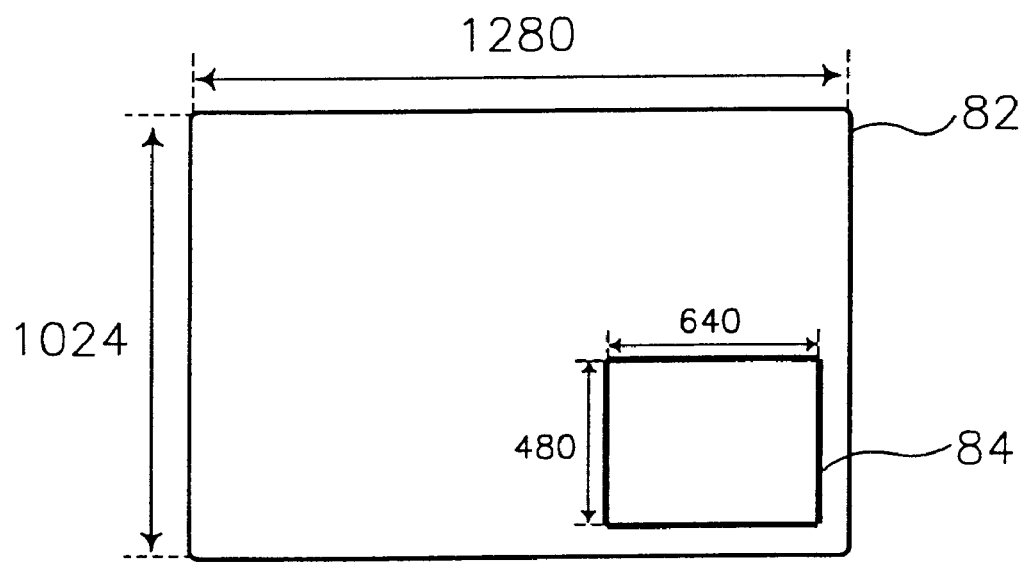
FIG. 2 is a schematic diagram illustrating an exemplary screen arrangement of the display monitor apparatus of the FIG. 1.
Figure 3:
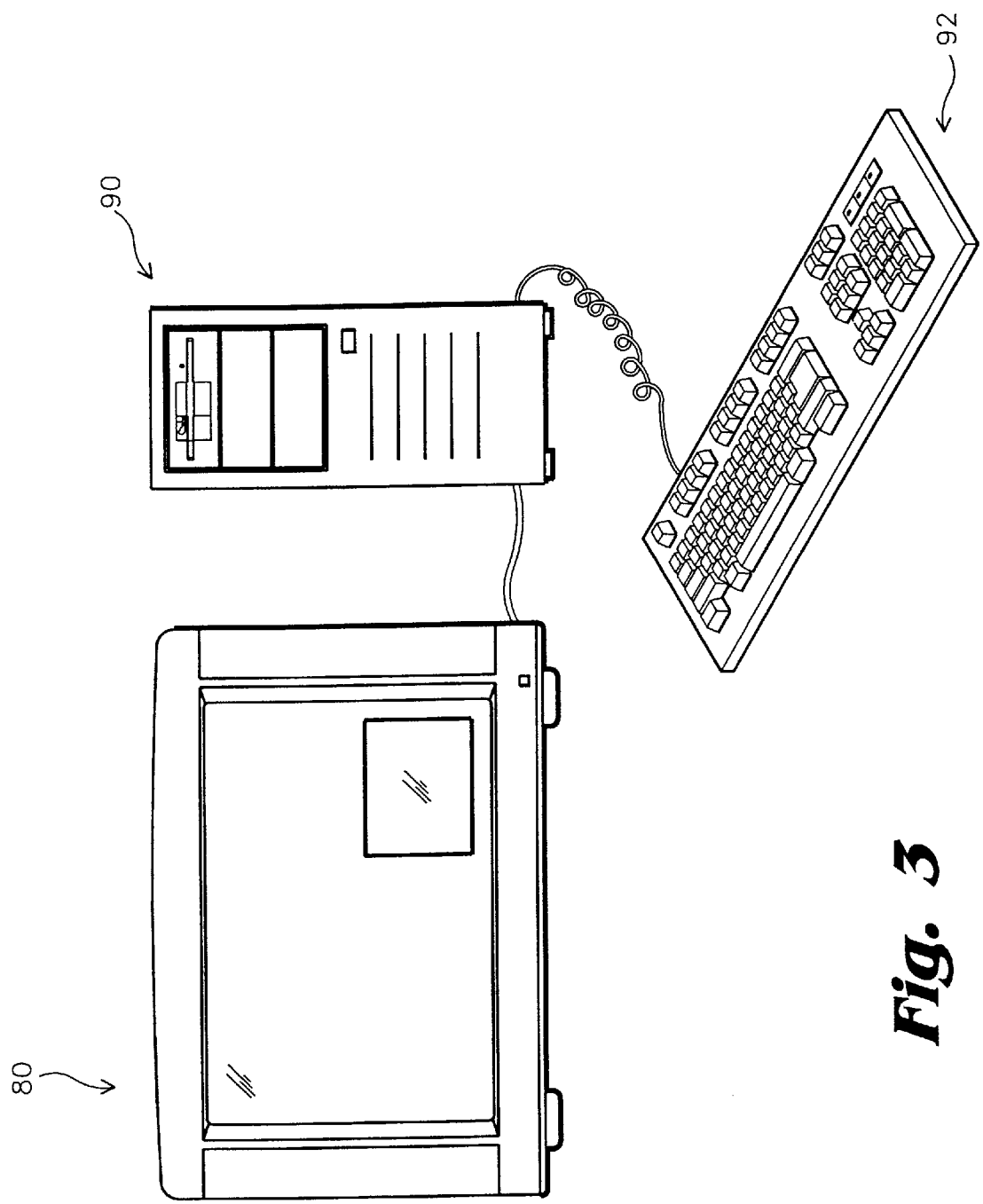
FIG. 3 is a schematic diagram illustrating a home computer system having an exemplary display monitor apparatus of the present invention.

Referring to FIGS. 1–3, there is shown a video display monitor apparatus 80 according to a preferred embodiment of the present invention. The display monitor apparatus 80 has a composite input circuit 10 which receives either a broadcast composite TV signal or an additional composite signal supplied from a video player (e.g., a video cassette recorder), and separates horizontal and vertical synchronizing signals Hsync1 and Vsync1, and Y and C video signals from the received composite signal, and transforms the separated Y and C video signals into analog R, G and B video signals Video1. Two video processing circuits 20 and 30 and a timing control circuit 40 are provided for display monitor apparatus 80. Timing control circuit 40 performs timing control for video processing circuits 20 and 30, in response to synchronizing signals Hsync1 and Vsync1 and additional horizontal and vertical synchronizing signals Hsync2 and Vsync2 applied from a personal computer 90 (referring to FIG. 3) having a keyboard 92. As shown in FIG. 2, a viewing area 84 of the image formed by video signals Video3 from computer 90 is disposed within another viewing area 82 of the image formed by the TV video signals in the form of PIP (picture-in-picture). Thus, a user is able to watch a still picture (i.e., the image formed by the video signals from the computer) together with a moving picture (i.e., the image formed by the TV video signals) simultaneously so as to control home application and automation systems without changing from the moving mode to the still mode.

Referring back to FIG. 1, composite input circuit 10 is made up of a TV tuner circuit for receiving a composite TV signal on a specific channel selected by a user, a separation circuit for separating the horizontal and vertical synchronizing signals Hsync1 and Vsync1, and the Y and no C video signals from the received TV signal, and a video encoder for transforming the separated Y and C video signals into the analog R, G and B video signals Video1, even though not shown in the figure. The composite input circuit 10 also includes an input terminal for receiving an additional composite signal supplied from a video player apparatus such as a video cassette recorder (or video tape recorder), a video disc player, etc. In the composite input circuit 10, the horizontal and vertical synchronizing signals Hsync1 and Vsync1 and additional Y and C video signals are separated from the additional composite signal supplied from the video player. The additional separated Y and C video signals are transformed into the R, G and B video signals Video1.

For explanation purposes, it is assumed that the TV signal (or the signal of the video player) in NTSC system, the computer video signal and the CRT display apparatus have the characteristics as shown in the following table:

| | Hsync frequency (KHz) | Vsync frequency (Hz) | video clock (MHZ) | horizontal resolution (pixels) | vertical resolution (lines) | active resolution (pixels × lines) |
|---|---|---|---|---|---|---|
| TV | 15.75 | 60 | 4.5 | 285 | 525 | |
| computer | 31.50 | 60 | 25.175 | 800 | 525 | 640 × 480 |
| CRT | 64.00 | 60 | 110 | 1600 | 1066 | 1280 × 1024 |

Video processing circuit 20 receives video signals Video1 from composite input circuit 10 and converts them into analog R, G and B video signals suitable for a predetermined resolution (e.g., 1280×1024) of CRT display apparatus 80 in accordance with the timing control of timing control circuit 40. As is shown in FIG. 1, video processing circuit 20 includes an analog-to-digital (A/D) conversion circuit 22, a dual port video random access memory (VRAM) or frame buffer memory 24 and a digital-to-analog (D/A) conversion circuit 26.

A/D conversion circuit 22 converts analog video signals Video1 into digital R, G and B video data and synchronized with a sampling signal SS1 of 4.5 MHZ from timing control circuit 40, respectively.

Dual port VRAM 24 is provided for storing the video data inputted through a parallel input port thereof in response to a write command (e.g, a write enable signal) issued from timing control circuit 40, and for outputting the stored video data through a serial output port thereof in response to a read command (e.g., a read enable signal) also issued from timing control circuit 40. Timing control circuit 40 controls such a read operation of the VRAM 24 that one scan line is read twice therefrom, since the ratio of the vertical resolution of the TV vs. that of the CRT display is one half (=525/1066).

D/A conversion circuit 26 converts the R, G and B video data from VRAM 24 into analog R, G and B video signals Video2 synchronized with an output control clock signal H_TV_OUT of 19.6 MHZ from timing control circuit 40. The frequency $F_{s1}$ of 19.6 MHz is given by the following equations (1) and (2).

$$R_{h1} = \frac{1600}{285} = 5.6 \quad (1)$$

$$F_{s1} = \frac{110 \text{ MHz}}{5.6} = 19.6 \text{ MHz} \quad (2)$$

where, $R_{h1}$ represents the ratio of CRT horizontal resolution vs. TV horizontal resolution.

Another video processing circuit 30 receives the analog R, G and B video signals Video3 from computer 90, and converts video signals Video3 into analog R, G and B video signals Video4 suitable for the predetermined resolution (i.e., 1280×1024) of CRT display apparatus 80 in accordance with the timing control of timing control circuit 40.

Video processing circuit 30 has the same circuit construction as the video processing circuit 20.

The A/D conversion circuit 32 respectively converts analog R, G and B video signals Video3 into digital R, G and B video data synchronized with a sampling signal SS2 of 25.175 MHz from timing control circuit 40.

Dual port VRAM 34 stores the video data inputted through a parallel input port thereof in response to a write command (e.g, a write enable signal) issued from timing control circuit 40, and outputs the stored video data through a serial output port thereof in response to a read command (e.g., a read enable signal) issued from timing control circuit 40. Herein, assuming that the vertical size of the PIP screen (i.e., computer image) is one half (=640) of that (=1024) of the whole screen (i.e., TV image), timing control circuit 40 controls the read operation of VRAM 34 to be performed line-to-line since the ratio of the vertical resolution of the computer vs. that of the CRT display is one half (=525/1066).

D/A conversion circuit 36 is provided to convert the R, G and B video data from VRAM 34 into analog R, G and B video signals Video4 synchronized with an output control clock signal H_C_OUT of 55 MHz from timing control circuit 40, respectively. When the ratio of CRT horizontal resolution vs. that of the computer is represented by $R_{h2}$, the frequency $F_{s2}$ of 55 MHz is given by the following equations (3) and (4).

$$R_{h2} = \frac{1600}{800} = 2 \quad (3)$$

$$F_{s2} = \frac{110 \text{ MHz}}{2} = 55 \text{ MHz} \quad (4)$$

As described above, two video processing circuits 20 and 30 convert the TV video signals (or the video signals from the video player) Video1 and the computer video signals Video3 into analog R, G and B video signals Video2 and Video 4, respectively, suitable for a predetermined resolution (e.g., 1280×1024) of CRT display apparatus 80 in accordance with the timing control of timing control circuit 40.

A video output circuit 50 selectively receives video signals Video2 and Video4 and, in response to a selection control signal Smux from timing control circuit 40, drives the R, G and B electron guns of CRT 52 by using video signals Video2 and Video4. Thus, a moving picture (i.e., the image formed by the TV video signals) 82 and a still picture (i.e., the image formed by the video signals from the computer) 84 are simultaneously displayed on the screen of CRT 52, as shown in FIG. 2.

Turning again to FIG. 1, a deflection circuit 60 is provided for display apparatus 80. Deflection circuit 60 includes a deflection control circuit 62 and a deflection output circuit 64 which are provided to control the amount of currents flowing through horizontal and vertical deflection yokes provided around the neck of CRT 52 in synchronization with horizontal and vertical synchronizing signals Hsync3 and Vsync3 supplied from timing control circuit 40. Deflection output circuit 64 outputs screen and focus control signals Sscreen and Sfocus in synchronization with vertical synchronizing signals Hsync4 and Vsync4 supplied from deflection control circuit 62.

Composite input circuit 10 also separates an audio signal Audio1 from the composite TV signal. An audio processing circuit 70 is provided to process the audio signal Audio1 and an additional audio signal Audio2 supplied from computer 90. The output audio signal is selected according to whether it is desired to provide audio corresponding to or image viewing area 82 or image viewing area 84 to speaker 72.

As described above, the display apparatus according to the present invention enables a user to watch a still picture (i.e., the image formed by the video signals from the computer) together with a moving picture (i.e., the image formed by the TV video signals) simultaneously, so that home application and automation systems under the control of the computer can be conveniently controlled without taking a change from the moving mode to the still mode.

What is claimed is:

1. A display monitor apparatus having a predetermined main screen resolution and a predetermined picture-in-picture screen resolution, said apparatus comprising:

a composite input circuit for receiving a composite television signal, separating first horizontal and vertical synchronizing signals and luminance and chrominance video signals from said received composite television signal, and transforming said separated luminance and chrominance video signals into first analog R, G and B video signals;

a timing control circuit for performing timing control in response to said first horizontal and vertical synchronizing signals and in further response to second horizontal and vertical synchronizing signals, wherein said timing control circuit receives said second horizontal and vertical synchronizing signals from a computer;

a first video processing circuit for converting said first analog R, G and B video signals into second analog R, G and B video signals suitable for one of said predetermined main screen resolution and said predetermined picture-in-picture screen resolution in accordance with said timing control of said timing control circuit to display a first image on a display means; and a second video processing circuit for converting third analog R, G and B video signals supplied from said computer into fourth analog R, G and B video signals suitable for a different one of said predetermined main screen resolution and said predetermined picture-in-picture screen resolution in accordance with said timing control of said timing control circuit to display a second image simultaneously with said first image.

2. The display monitor apparatus of claim 1, wherein said composite input circuit separates a first audio signal from said composite television signal.

3. The display monitor apparatus of claim 2; further comprising an audio processing circuit for processing said first audio signal and a second audio signal supplied from said computer.

4. The display monitor apparatus of claim 1, wherein said display means comprises a cathode ray tube having R, G and B electron guns, and having horizontal and vertical deflection yokes provided around a neck of said cathode ray tube, said display monitor apparatus further comprising:

a video output circuit for selectively receiving and outputting said second and fourth analog R, G and B video signals in response to a selection control signal from said timing control circuit for driving said R, G and B electron guns of said cathode ray tube; and a deflection circuit for controlling amount of currents flowing through said horizontal and vertical deflection yokes in synchronization with third horizontal and vertical synchronizing signals supplied from said timing control circuit.

5. The display monitor apparatus of claim 1, wherein said first video processing circuit comprises:

an A/D conversion circuit for respectively converting said first analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said second analog R, G and B video signals in synchronization with an output control clock signal from said timing control circuit.

6. The display monitor apparatus of claim 1, wherein said second video processing circuit comprises:

an A/D conversion circuit for respectively converting said third analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said fourth analog R, G and B video signals in synchronization with an output control clock signal from said timing control circuit.

7. The display monitor apparatus of claim 1, wherein said composite input circuit comprises an input terminal for alternatively receiving an additional composite television signal, said additional composite television signal being supplied from a video player apparatus.

8. The display monitor apparatus of claim 7, wherein said display means comprises a cathode ray tube having R, G and B electron guns, and having horizontal and vertical deflection yokes provided around a neck of said cathode ray tube, said display monitor apparatus further comprising:

a video output circuit for selectively receiving and outputting said and fourth analog second R, G and B video signals in response to a selection control signal from said timing control circuit for driving said R, G and B electron guns of said cathode ray tube; and a deflection circuit for controlling amount of currents flowing through said horizontal and vertical deflection yokes in synchronization with third horizontal and vertical synchronizing signals supplied from said timing control circuit.

9. The display monitor apparatus of claim 8, wherein said first video processing circuit comprises:

an A/D conversion circuit for respectively converting said first analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said second analog R, G and B video signals in synchronization with an output control clock signal from said timing control circuit.

10. The display monitor apparatus of claim 8, wherein said second video processing circuit comprises:

an A/D conversion circuit for respectively converting said third analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said fourth analog R, G and B video signals in synchronization with an output control clock signal from said timing control circuit.

11. The display monitor apparatus of claim 7, wherein said composite input circuit separates a first audio signal from said additional composite television signal.

12. The display monitor apparatus of claim 11, further comprising an audio processing circuit for processing said first audio signal and a second audio signal supplied from said computer.

13. The display monitor apparatus of claim 7, wherein said video player apparatus is any one of a video cassette recorder and a video disc player.

14. A display monitor apparatus having a predetermined main screen resolution and a predetermined picture-in-picture screen resolution, the apparatus comprising:

a composite input circuit for receiving a composite television signal, separating first horizontal and vertical synchronizing signals and luminance and chrominance video signals from said received composite television signal, and transforming said separated luminance and chrominance video signals into first analog R, G and B video signals;

a timing control circuit for performing timing control in response to said first horizontal and vertical synchronizing signals and in further response to second horizontal and vertical synchronizing signals, wherein said timing control circuit receives said second horizontal and vertical synchronizing signals from a computer;

a first video processing circuit for converting said first analog R, G and B video signals into second analog R, G and B video signals suitable for said predetermined main screen resolution in accordance with said timing control of said timing control circuit to display a first image on a display means; and a second video processing circuit for converting third analog R, G and B video signals supplied from said computer into fourth analog R, G and B video signals suitable for said predetermined picture-in-picture screen resolution in accordance with said timing control of said is timing control circuit to display a second image within said first image.

15. The display monitor apparatus of claim 14, wherein said first video processing circuit comprises:

an A/D conversion circuit for respectively converting said first analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said second analog R, G and B video signals in synchronization with an output control clock signal from said timing control circuit.

16. The display monitor apparatus of claim 14, wherein said second video processing circuit comprises:

an A/D conversion circuit for respectively converting said third analog R, G, and B video signals into digital video data in synchronization with a sampling signal from said timing control circuit;

a dual port RAM for storing said digital video data input through a parallel input port thereof in response to a write command issued from said timing control circuit, wherein said dual port RAM outputs said stored digital video data through a serial output port thereof in response to a read command issued from said timing control circuit; and a D/A conversion circuit for respectively converting said digital video data output from said dual port RAM into said fourth analog R, G and B video signals in synchronization with an output control clock signal from said timing control circuit.

17. The display monitor apparatus of claim 14, wherein said display means comprises a cathode ray tube having R, G and B electron guns, and having horizontal and vertical deflection yokes provided around a neck of said cathode ray tube, said display monitor apparatus further comprising:

a video output circuit for selectively receiving and outputting said second and fourth analog R, G and B video signals in response to a selection control signal from said timing control circuit for driving said R, G and B electron guns of said cathode ray tube; and a deflection circuit for controlling amount of currents flowing through said horizontal and vertical deflection yokes in synchronization with third horizontal and vertical synchronizing signals supplied from said timing control circuit.

18. A method for displaying first and second image on a cathode ray tube of a display monitor apparatus having a predetermined main screen resolution and a predetermined picture-in-picture screen resolution, said method comprising the steps of:

receiving a composite television signal;

separating first horizontal and vertical synchronizing signals from said received composite television signal;

separating luminance and chrominance video signals from said received composite television signal;

transforming said separated luminance and chrominance video signals into first analog R, G and B video signals;

receiving second horizontal and vertical synchronizing signals from a computer;

receiving second analog R, G and B video signals from said computer;

generating timing control signals in a timing control circuit in response to said first horizontal and vertical synchronizing signals and in further response to said second horizontal and vertical synchronizing signals;

converting said second analog R, G and B video signals into third analog R, G and B video signals suitable for said predetermined main screen resolution in accordance with said timing control signals to display said first image; and converting said first analog R, G and B video signals into fourth analog R, G and B video signals suitable for said predetermined picture-in-picture screen resolution in accordance with said timing control signals to display said second image within said first image.

19. The method as set forth in claim 18, further comprising the steps of:

selectively receiving and outputting said third and fourth analog R, G and B video signals in response to a selection control signal for driving R, G and B electron guns of said cathode ray tube;

generating third horizontal and vertical synchronizing signals by said timing control circuit; and controlling amount of currents flowing through horizontal and vertical deflection yokes of said cathode ray tube in synchronization with said third horizontal and vertical synchronizing signals.

* * * * *